(12) United States Patent
Barreto

(10) Patent No.: US 7,166,154 B2
(45) Date of Patent: Jan. 23, 2007

(54) SYSTEM AND A METHOD FOR AN EDIBLE, OPTICALLY INVISIBLE INK

(75) Inventor: Marcos A. Barreto, Aguadilla, PR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 300 days.

(21) Appl. No.: 10/703,697

(22) Filed: Nov. 6, 2003

(65) Prior Publication Data
US 2005/0099475 A1   May 12, 2005

(51) Int. Cl.
C09D 11/02 (2006.01)
(52) U.S. Cl. .............. 106/31.13; 106/31.27; 106/31.6; 106/31.58; 106/31.86
(58) Field of Classification Search ............ 106/31.13, 106/31.27, 31.6, 31.58, 31.86
See application file for complete search history.

(56) References Cited

U.S. PATENT DOCUMENTS

| | | | |
|---|---|---|---|
| 3,961,082 A | 6/1976 | Winkler | |
| 4,548,825 A | 10/1985 | Voss et al. | |
| 4,910,185 A | 3/1990 | Satake et al. | |
| 5,006,362 A * | 4/1991 | Hilborn | ............ 427/2.23 |
| 5,331,140 A | 7/1994 | Stephany | |
| 5,435,840 A | 7/1995 | Hilborn | |
| 5,541,633 A | 7/1996 | Winnik et al. | |
| 5,693,693 A | 12/1997 | Auslander et al. | |
| 5,711,791 A | 1/1998 | Croker et al. | |
| 5,755,860 A | 5/1998 | Zhu | |
| 5,834,047 A | 11/1998 | Ahn | |
| 5,939,468 A | 8/1999 | Siddiqui | |
| 5,992,742 A | 11/1999 | Sullivan et al. | |
| 6,299,374 B1 | 10/2001 | Naor et al. | |
| 6,436,682 B1 | 8/2002 | Bryan et al. | |
| 6,623,553 B1 | 9/2003 | Russell et al. | |

FOREIGN PATENT DOCUMENTS

WO   WO 00/16986   3/2000

* cited by examiner

Primary Examiner—J. A. Lorengo
Assistant Examiner—Veronica Faison-Gee

(57) ABSTRACT

An ink, wherein the ink includes a jettable vehicle, and a colorant configured to fluoresce in a visible light range when exposed to an ultraviolet (UV) light, wherein the ink is edible, and wherein the ink is invisible when viewed under white light conditions.

58 Claims, 6 Drawing Sheets

SYSTEM AND A METHOD FOR AN EDIBLE, OPTICALLY INVISIBLE INK

BACKGROUND

Pharmaceutical products such as pills and capsules traditionally include a number of markings. Marks or printed information on pharmaceutical products typically include information such as logos, names, or bar codes that may be used to identify the type, dosage, and/or source of the pharmaceuticals. These markings also aid in the dispensing and administration of pharmaceuticals to patients.

In order to mark or otherwise label pharmaceutical products such as pills and capsules, the methodology has to be approved by the food and drug administration (FDA). The FDA has a number of lists containing approved colorants and labels that may be used to mark or otherwise label pharmaceutical products.

Traditional methods of marking pharmaceutical products such as pills and capsules include coloring the pharmaceutical products with FDA certified colorants, altering the surface appearance of the pharmaceutical products through engravings, applying a label to the surface of the pharmaceutical products, or painting the pharmaceutical product.

While traditional methods are somewhat effective in marking or otherwise distinguishing pharmaceutical products, traditional methods of marking pharmaceutical products significantly compromise the outward appearance of the pharmaceutical products. Additionally, traditional methods do little to facilitate the control of counterfeit production and fraudulent dispensing of pharmaceuticals, since these outer markings are easily identifiable and reproducible. Moreover, a majority of the traditional methods and formulations for marking or otherwise labeling pharmaceutical products necessitate contact with the pharmaceutical. Any such contact with the pharmaceutical products increases the likelihood of causing physical or chemical damage to the pharmaceutical product.

SUMMARY

An ink, wherein the ink includes a jettable vehicle, and a colorant configured to fluoresce in a visible light range when exposed to an ultraviolet (UV) light, wherein the ink is edible, and wherein the ink is invisible when viewed under white light conditions.

BRIEF DESCRIPTION OF THE DRAWINGS

The accompanying drawings illustrate various embodiments of the present system and method and are a part of the specification. The illustrated embodiments are merely examples of the present system and method and do not limit the scope thereof.

Throughout the drawings, identical reference numbers designate similar, but not necessarily identical, elements.

DETAILED DESCRIPTION

An exemplary system and method for implementing an edible, invisible ink is disclosed herein. More specifically, a jettable ink is disclosed that is not visible to the naked eye under normal white light conditions; however, when exposed to ultraviolet (UV) light, the ink fluoresces in the visible range making printed material visible to the naked eye. Additionally, the invisible ink is non-toxic, edible, and made of compounds listed in the Generally Regarded as Safe (GRAS) list sponsored by the Food and Drug Administration (FDA).

As used in the present specification and the appended claim, the term "edible" ink is meant to be understood broadly as any composition that is suitable for human consumption and is non-toxic. Similarly, the phrase "edible ink" is meant to be understood as any ink that is suitable for human consumption and complies with applicable standards such as food, drug, and cosmetic (FD&C) regulations in the United States and/or Eurocontrol experimental centre (E.E.C.) standards in the European Union. Additionally, the term "invisible" is meant to be understood broadly as meaning any image, color, or shading that, when viewed by the naked eye, is not prominent or readily noticeable. The term "jettable" is meant to be understood both in the present specification and in the appended claims as any material that may be selectively deposited by any digitally addressable inkjet material dispenser.

In the following description, for purposes of explanation, numerous specific details are set forth in order to provide a thorough understanding of the present system and method for implementing an edible, invisible ink. It will be apparent, however, to one skilled in the art, that the present method may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Exemplary Structure

Figure 1:
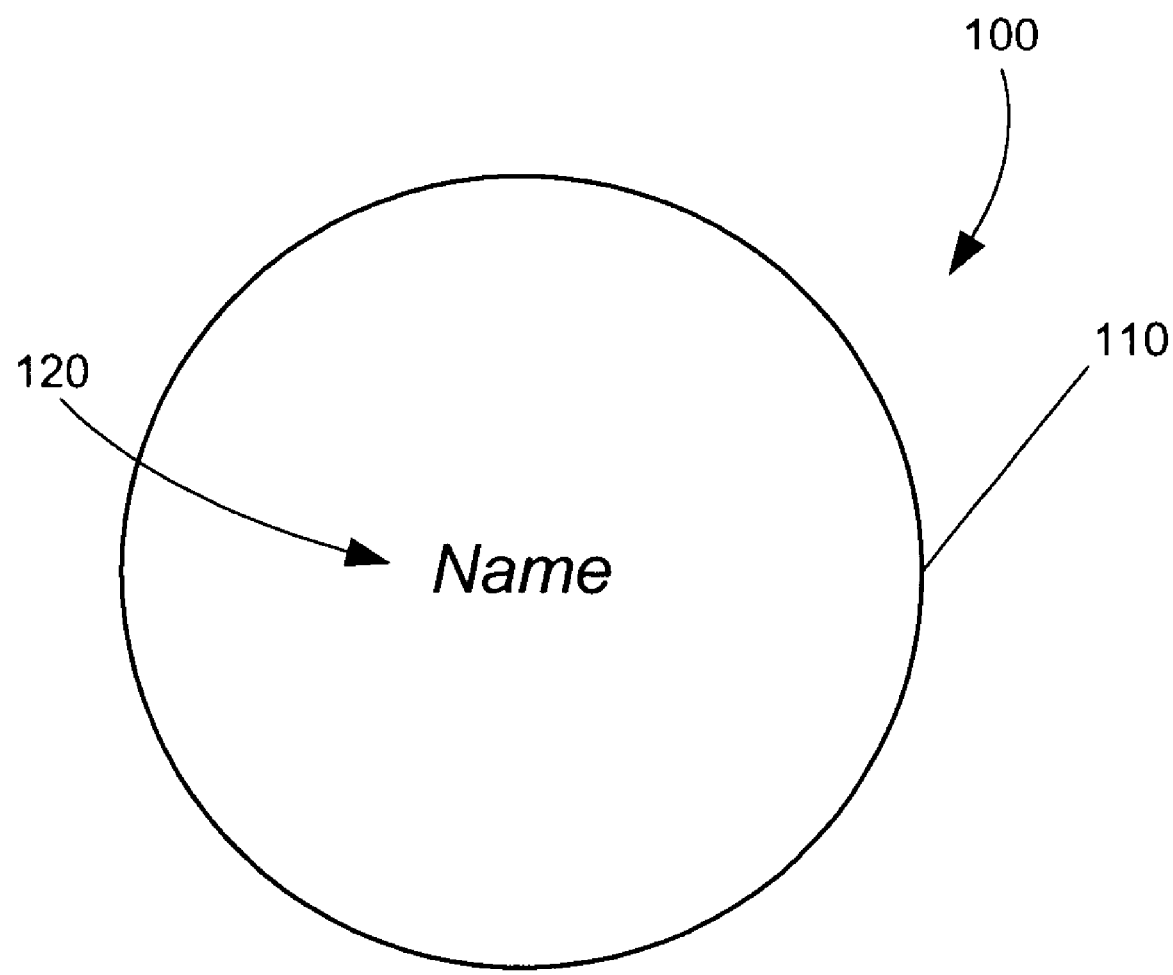
FIG. 1 is a perspective view of a pharmaceutical product labeled according to teachings of the prior art.

FIG. 1 illustrates a traditionally marked pharmaceutical product (100). As shown in FIG. 1, the pharmaceutical product (100) includes a pill (110) having a product name (120) printed thereon. As shown in FIG. 1, the product name (120) or other surface markings compromise the outward appearance of the pharmaceutical product (100).

Figure 2:
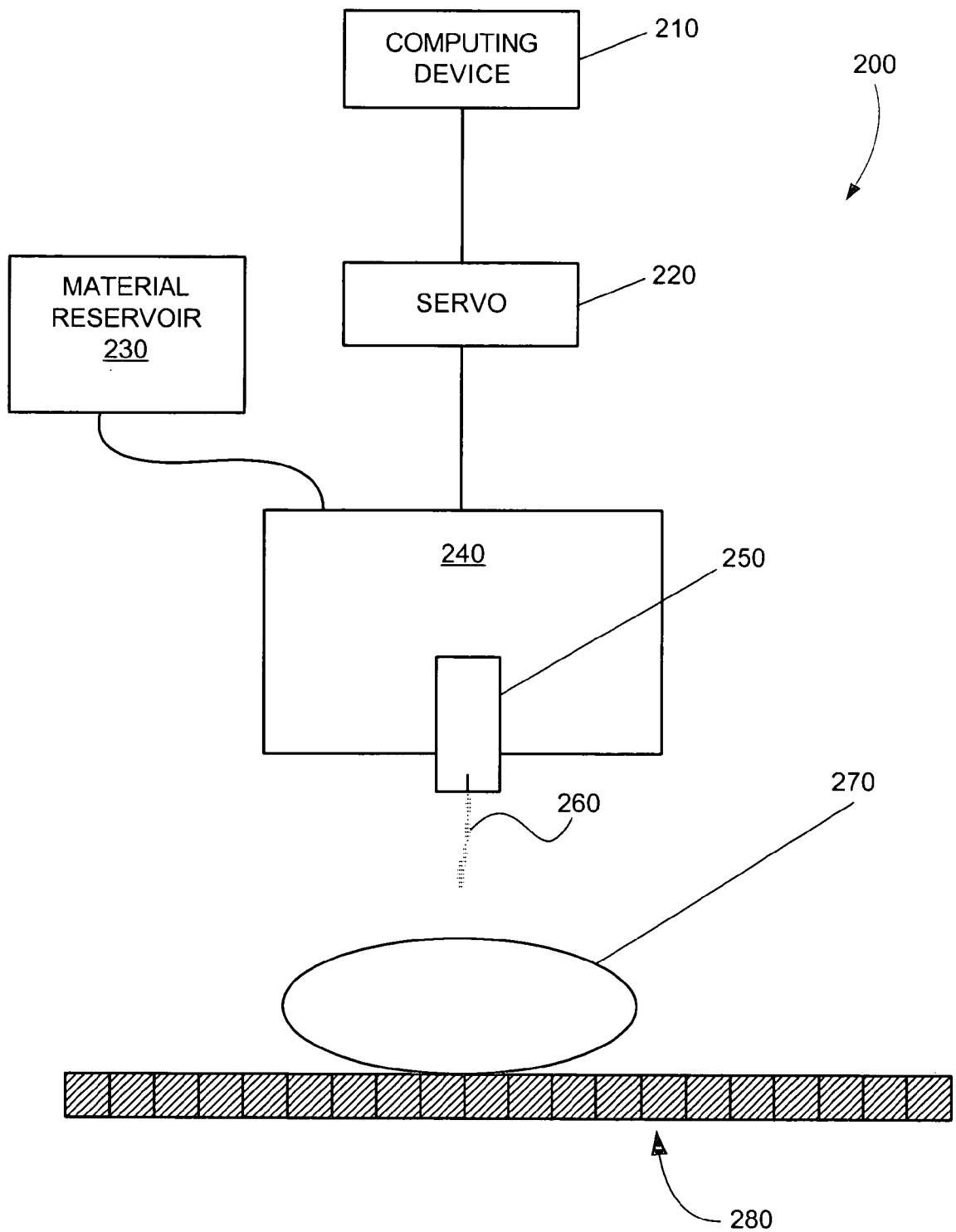
FIG. 2 is a simple block diagram illustrating a system that may be used to implement exemplary embodiments of the present system and method.

FIG. 2 illustrates an exemplary system (200) that may be used to apply an edible, invisible ink composition (260) to a pharmaceutical product (270) according to one exemplary embodiment. As shown in FIG. 2, the present system includes a computing device (210) controllably coupled through a servo mechanism (220) to a moveable carriage (240) having an ink-jet dispenser (250) disposed thereon. A material reservoir (230) is also coupled to the moveable carriage (240), and consequently to the inkjet print head (250). A substrate (280) is located adjacent to the inkjet dispenser (250) having a pharmaceutical product (270) disposed thereon. While the present embodiment is described in the context of marking a pharmaceutical product (270) with an edible, invisible ink (260), the present system and method may be used to mark any number of items with the present edible, invisible ink (260) including, but in no way limited to, food products, dental products, etc. The above-mentioned components of the present system will now be described in further detail below.

The computing device (210) that is controllably coupled to the servo mechanism (220), as shown in FIG. 2, controls the selective deposition of an edible, invisible ink (260) on the pharmaceutical product (270). A representation of a desired image or label may be formed using a program hosted by the computing device (210). That representation may then be converted into servo instructions that are then housed in a processor readable medium (not shown). When accessed by the computing device (210), the instructions housed in the processor readable medium may be used to control the servo mechanisms (220) as well as the movable carriage (240) and ink-jet dispenser (250). The computing device (210) illustrated in FIG. 2 may be, but is in no way limited to, a workstation, a personal computer, a laptop, a personal digital assistant (PDA), or any other processor containing device.

The moveable carriage (240) of the present printing system (200) illustrated in FIG. 2 is a moveable material dispenser that may include any number of inkjet material dispensers (250) configured to dispense the present edible, invisible ink (260). The moveable carriage (240) may be controlled by a computing device (210) and may be controllably moved by, for example, a shaft system, a belt system, a chain system, etc. making up the servo mechanism (220). As the moveable carriage (240) operates, the computing device (210) may inform a user of operating conditions as well as provide the user with a user interface.

As an image is printed on a pharmaceutical product, the computing device (210) may controllably position the moveable carriage (240) and direct one or more of the inkjet dispensers (250) to selectively dispense an edible, invisible ink at predetermined locations on the pharmaceutical product (270) as digitally addressed drops, thereby forming the desired image. The inkjet material dispensers (250) used by the present printing system (100) may be any type of inkjet dispenser configured to perform the present method including, but in no way limited to, thermally actuated inkjet dispensers, mechanically actuated inkjet dispensers, electrostatically actuated ink-jet dispensers, magnetically actuated dispensers, piezoelectrically actuated dispensers, continuous inkjet dispensers, etc. Additionally, the ink-jet material dispenser can be heated to assist in dispensing the edible, invisible ink. Moreover, the present edible, invisible ink can be distributed using any number of printing processes including, but in no way limited to, inkjet printing, lithography, screen printing, gravure, and flexo printing.

The material reservoir (230) that is fluidly coupled to the ink-jet material dispenser (250) houses the present edible, invisible ink (260) prior to printing. The material reservoir may be any sterilizeable container configured to hermetically seal the edible, invisible ink (260) prior to printing and may be constructed of any number of materials including, but in no way limited to metals, plastics, composites, or ceramics.

FIG. 2 also illustrates the components of the present system that facilitate reception of the edible, invisible ink (260) on the pharmaceutical product (270). As shown in FIG. 2, a substrate (280) may transport and/or positionally secure a pharmaceutical product (270) during a printing operation. The formation and composition of the edible, invisible ink (260) will now be described in detail below.

Exemplary Composition

The edible, invisible ink (260) illustrated in FIG. 2 is configured to provide an edible yet optically invisible ink that may be selectively viewed upon application of ultraviolet (UV) light. According to one exemplary embodiment, the present edible, invisible ink (260) includes at least two main components: an ink vehicle and a colorant.

The ink vehicle component of the present edible, invisible ink (260) provides a liquid solution that facilitates dispersion and dissolution of the colorant while enabling the selectively controlled transport of the colorant from an inkjet material dispenser to a pharmaceutical product (270) or other printing substrate. Additionally, the ink vehicle can also act as a binder to affix the colorant to the pharmaceutical product (270) or other print substrate. The components of the ink vehicle may be made of any edible compound with invisible properties. Examples of these compounds are listed in the Generally Regarded as Safe (GRAS) list sponsored by the food and drug administration (FDA). According to one exemplary embodiment, the ink vehicle includes at least a solvent, but may also include additives configured to enhance various properties and characteristics of the resulting ink. Property enhancing additives that may form a part of the ink vehicle may include, but are in no way limited to, surfactants, buffers, and/or humectants.

The solvent component of the ink vehicle is included in the present edible, invisible ink (260) for dispersion and transport of the colorant as well as any additives. The vehicle solvent imparts a jettable viscosity to the edible, invisible ink (260) while also evaporating at a rate sufficient to make a printed image resistant to smudging soon after it is deposited on a pharmaceutical product (270) or other ink receiving substrate. According to one exemplary embodiment, the solvent comprises water, thus creating a water-based vehicle. In addition to low cost, water is effective as a solvent for many additives, greatly reduces inkjet dispenser compatibility issues, effectively suspends colorants, and effectively controls drying rates of the ink. More specifically, a water-based vehicle may comprise from 20% by volume water up to about 90% by volume water. In another exemplary embodiment, the solvent component of the ink vehicle includes a mixture of water and an alcohol, such as ethyl alcohol. The addition of an alcohol to a solvent affects the viscosity and drying rate of the ink vehicle, as well as acting as a surfactant.

Surfactants and emulsifiers may be added to the solvent component of the present edible, invisible ink (260) in order to facilitate dispersion and/or dissolution of the colorant and any other additive in the solvent. Typically, an edible alcohol may be used as the vehicle surfactant including, but in no way limited to, ethyl alcohol, glycerol, methyl alcohol, isopropyl alcohol, and butyl alcohol. Ethyl alcohol, for example, decreases the surface tension of water, thereby allowing a colorant and other additives to dissolve and/or disperse throughout the water more easily. The ethyl alcohol may also facilitate the jettability of the present edible, invisible ink (260). Moreover, other edible compounds besides alcohols may also be used as the surfactant or emulsifier, including, but in no way limited to, lecithin, crillet, polyoxyethylene sorbitan monostearate (TWEEN), xanthan gum, sorbitol, and starches such as maize starch, corn starch, and potato starch. According to one exemplary embodiment, a surfactant or emulsifier may be present in a concentration of up to about 20% by volume of the ink vehicle. In one particular embodiment, the surfactant or emulsifier comprises ethyl alcohol in a concentration of about 17% to about 20% by weight. In another aspect, ethyl alcohol comprises from about 13% to about 17% by weight of the vehicle.

In addition to solvents, surfactants, and emulsifiers, the ink vehicle may also include a pH buffer to control the pH level of the edible, invisible ink (260). The pH level of the edible visible ink (260) may be adjusted to vary, among other things, the fluorescence intensity of the colorant. According to one exemplary embodiment, an acid is used as a buffer to increase the acidity of the ink. Increasing the acidity level of the ink intensifies the fluorescence of some colorants, such as quinine sulfate, making the edible, invisible ink (260) fluoresce brighter thereby making it more visible under UV light. The concentration of acid used may vary depending on the desired fluorescence intensity but typically comprises up to about 1% by weight of the vehicle. In one specific embodiment, the buffer comprises sulfuric acid in a concentration of about 0.4% by weight of the vehicle. In another embodiment, the acid is present in the vehicle in a concentration of about 5 milligrams per milliliter of water.

A humectant may also be included in the present ink vehicle to control the moisture content and viscosity of the resulting edible, invisible ink (260). The ink vehicle typically dries by evaporation once it is disposed on the pharmaceutical product (270) or other substrate surface; however, drying prior to printing decreases viscosity and thus may inhibit the jettability of the edible, invisible ink (260). Therefore, a humectant may be included in the vehicle to keep the edible, invisible ink (260) from premature drying. The humectant may include, but is in no way limited to glycerin, sorbitol, mannitol, or any other edible humectant. According to one exemplary embodiment, the humectant can be present in the vehicle in a concentration of up to approximately 5% of the vehicle by volume. According to another exemplary embodiment, the humectant includes glycerin in a concentration of approximately 3% by volume, or about 4% by weight, of the ink vehicle.

According to one exemplary embodiment, the vehicle component of the present edible, invisible ink may also include other additives as needed including, but in no way limited to, driers, thinners, waxes, lubricants, reducing oils and solvents, body gum and binding varnish, antioxidants and anti-skinning agents, resins, and/or binders.

The present edible, invisible ink (260) also includes an edible, invisible colorant component. The colorant component typically is not visible to the human eye when applied to the pharmaceutical product (270) or other substrate, either because it is colorless or because it is the same color as the pharmaceutical product (270) or printing substrate. Suitable colorants include any edible compounds, or combinations thereof, that naturally fluoresce when exposed to UV light including, but in no way limited to, riboflavin, riboflavin phosphate including riboflavin 5'-phosphate, pyridoxine hydrochloride, folic acid, quinine sulfate, niacin, nicotinamide, D&C Orange No. 5, or any appropriate combination thereof. The afore-mentioned fluorescent colorants are also water-soluble, further facilitating their incorporation into a water-based ink vehicle.

According to one exemplary embodiment, the ink colorant comprises riboflavin or riboflavin phosphate in a concentration of up to approximately 9 milligrams per milliliter of ink vehicle, or up to approximately 1% by weight of the ink. While riboflavin and riboflavin phosphate have a slight yellow hue, they are invisible when printed on yellow, beige, or other similarly colored substrates. In another exemplary embodiment, the ink colorant comprises quinine sulfate in a concentration of up to approximately 1% by weight of the ink. The component concentrations mentioned above are merely given as examples and are in no way meant to limit the contemplated concentrations. Rather, the concentration of the colorant or other components can be lower if less intense fluorescence is desired or higher if more intense fluorescence is desired.

Exemplary Composition Forming Methods

Figure 3:
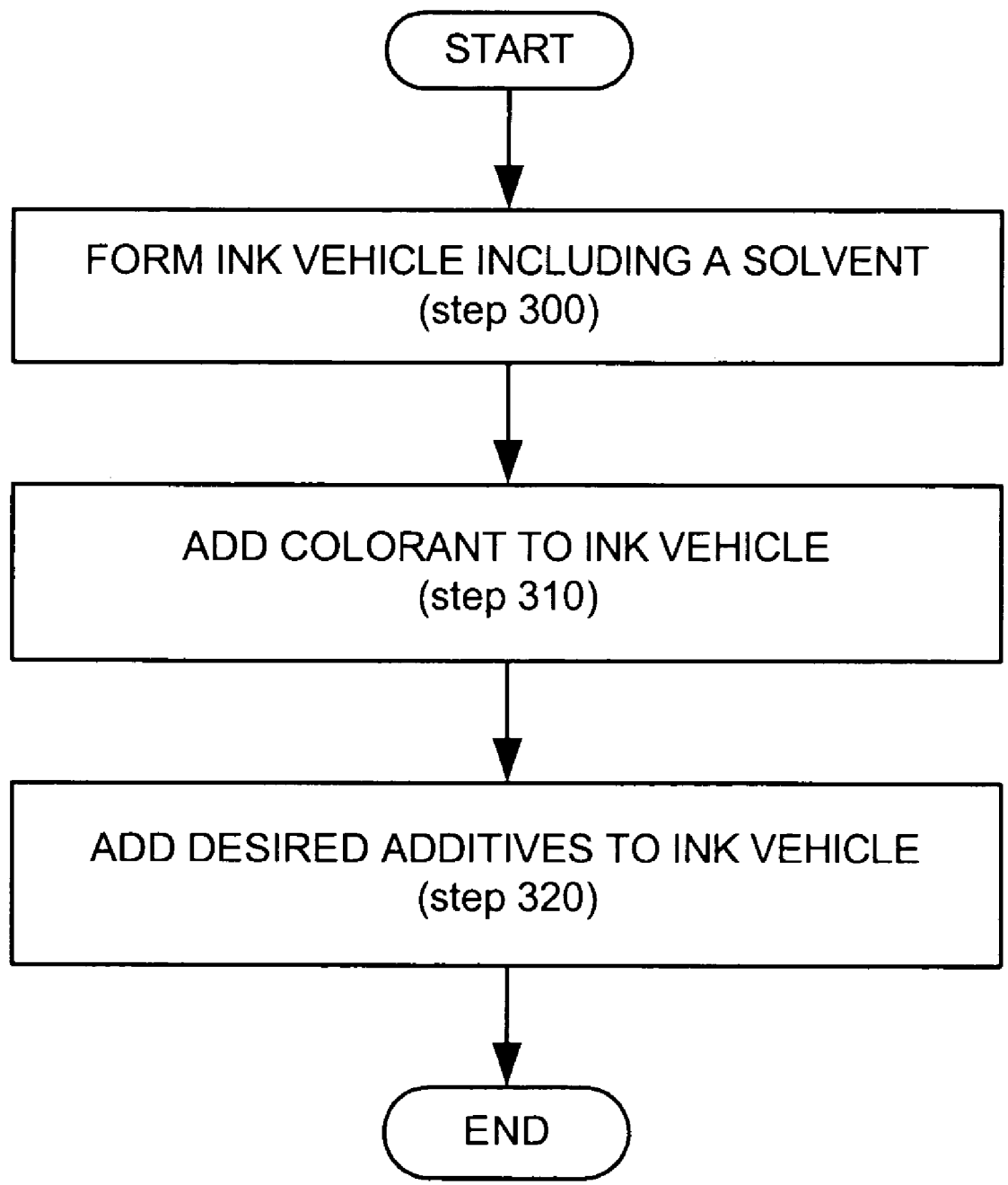
FIG. 3 is a flow chart illustrating a method for forming an edible optically invisible ink according to one exemplary embodiment.

FIG. 3 illustrates a method for forming the present edible, invisible ink (260; FIG. 2) according to one exemplary embodiment. The edible, invisible ink can be formed in a simple process of combining a solvent, colorant, and additives. As shown in FIG. 3, the present edible, invisible ink (260; FIG. 2) may be formed by first, forming an ink vehicle including a solvent (step 300). Once the ink vehicle is formed, a colorant may be added (step 310) followed by a number of desired additives (step 320). While FIG. 3 illustrates the additives being included in the present edible, invisible ink (260; FIG. 2) after the colorant is added (step 310), additives, such as a buffer, humectant, or surfactant can be added to the mixture before the colorant is added, after the colorant is added, or both.

According to one exemplary embodiment, the present edible, invisible ink can be made by performing the following steps: First, an aqueous acid or buffer solution is prepared. Colorant is then added to the acid solution and mixed. Next, a surfactant is added to the solution. Finally, the solution is mixed until the colorant is well dissolved. In another exemplary embodiment, the ink can be formed by performing the following steps: First, the ink vehicle is prepared by combining and mixing a solvent, surfactant, and humectant. The colorant is then added and mixed until dissolved.

The edible, invisible ink may be better understood in light of the following examples. The examples are merely intended to explain particular embodiments of the ink and are in no way intended to limit the ink to the compositions, processes, or methods described therein.

EXAMPLE 1

An edible, invisible ink may be prepared by performing the following steps. First, a 0.05 molar solution of aqueous sulfuric acid was prepared. After transferring this solution to a vial, 18.8 milligrams of quinine sulfate were added to the acid solution. Finally, 2 milliliters of ethyl alcohol were then added to the solution, which was then mixed until the quinine sulfate was well dispersed.

EXAMPLE 2

An edible, invisible ink may be prepared by first making an ink vehicle by combining 8 milliliters of water, 1.7 milliliters of ethyl alcohol, and 0.3 milliliters of glycerin.

Next, 90 milligrams of riboflavin phosphate were then added to the ink vehicle and mixed until the riboflavin phosphate was well dispersed.

Exemplary Implementation and Operation

Figure 4:
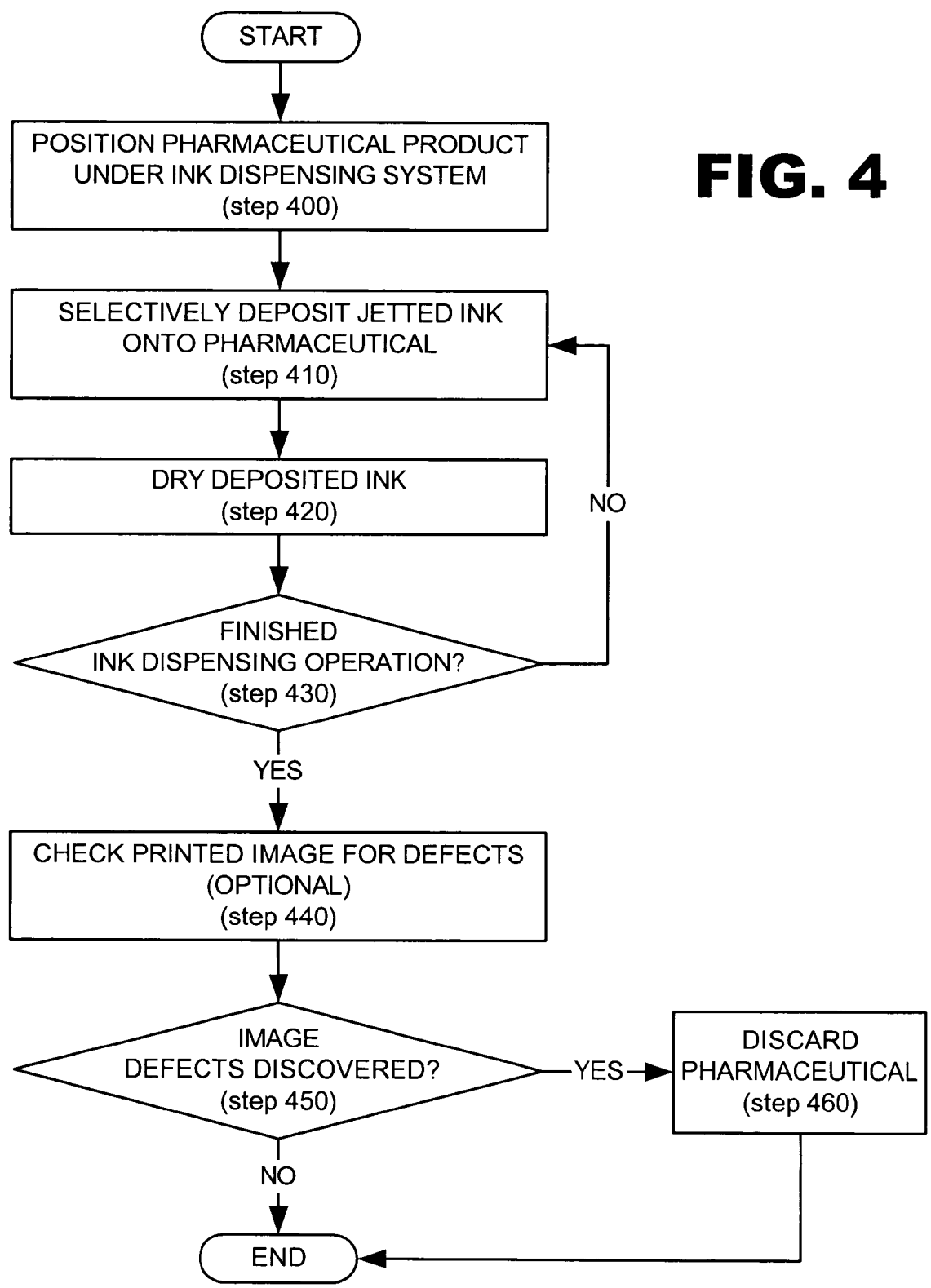
FIG. 4 is a flow chart illustrating a method for marking a pharmaceutical product with an edible, invisible ink according to one exemplary embodiment.

Once formed, the present edible, invisible ink (260; FIG. 2) may be jetted onto a pharmaceutical product (270; FIG. 2) or other substrate to form a desired image that is invisible to the naked eye under normal white light conditions but visibly fluoresces and reveals an image when exposed to UV light. FIG. 4 illustrates a method for implementing the present printing system (200; FIG. 2) to mark a pharmaceutical product with an edible, invisible ink (260; FIG. 2) according to one exemplary embodiment. As shown in FIG. 4, the present method begins by positioning a pharmaceutical product under the present ink dispensing system (step 400). Once positioned, the ink dispensing system selectively deposits the edible, invisible ink onto the pharmaceutical product (step 410) where it subsequently dries (step 420). Upon deposition of the edible, invisible ink, a determination is made as to whether the present printing system (200; FIG. 2) has completed its ink dispensing operation (step 430). If it is determined that the ink dispensing operation is not complete (NO, step 430), the printing system again selectively deposits jetted ink onto the pharmaceutical product (step 410). If, however, the ink dispensing operation is complete (YES, step 430), the printed image is optionally examined for defects (step 440). If no defects are found (NO, step 450), the printing process is complete. If, however, printing defects are found on the printed image transferred to the pharmaceutical (YES, step 450), the pharmaceutical product may be discarded (step 460). The above-mentioned steps will now be described in further detail below.

As shown in FIG. 4, the present method for printing an edible, invisible ink on a pharmaceutical product begins by positioning the pharmaceutical product to receive the edible, invisible ink under the ink dispensing system (step 400). As shown in FIG. 2, the pharmaceutical product (270) may be positioned under the ink dispensing system (200) by a moveable substrate (280). Alternatively, an operator may manually place the pharmaceutical product (270) adjacent to the ink dispensing system (200).

Once the pharmaceutical product (270) is correctly positioned, the ink dispensing system (200) may be directed by the computing device (210) to selectively deposit the edible, invisible ink (260) onto the pharmaceutical product (step 410; FIG. 4). As was mentioned previously, the image to be printed on the pharmaceutical product (270) may initially be developed on a program hosted by the computing device (210). The created image may then be converted into a number of processor accessible commands, which when accessed, may control the servo mechanisms (220) and the movable carriage (240) causing them to selectively emit edible, invisible ink (260) in the desired image. According to one exemplary embodiment, the edible, invisible ink (260) may be emitted by the ink dispensing system (200) to form any number of images including, but in no way limited to, product names, product dosages, product identifying barcodes, or general product indicating shades. Precision and resolution of the resulting image may be varied by adjusting a number of factors including, but in no way limited to, the type of inkjet material dispenser (250) used, the distance between the inkjet material dispenser (250) and the pharmaceutical product (270), and the print rate.

Once the edible, invisible ink (260) has been selectively deposited onto the pharmaceutical product (270) according to the desired image, the deposited ink may be dried to more securely affix the image to the pharmaceutical product (step 420; FIG. 4). When printed onto the pharmaceutical product (270) or other image receiving substrate, the colorant enters the surface of the substrate, thereby preventing the ink from smudging. Moreover, the ink vehicle evaporates thereby binding or affixing the colorant to the pharmaceutical product (270) such that it is resilient to smudging in a short amount of time. Evaporation of the ink vehicle and affixation of the colorant may occur more rapidly due to the addition of alcohols or driers in the ink vehicle.

Upon deposition and subsequent drying, it is determined whether or not the ink dispensing operation has been completed on the pharmaceutical product (step 430). Completion of the ink dispensing operation may be evaluated by a system operator or by the coupled computing device (210). According to one exemplary embodiment, the computing device (210) determines whether sufficient edible, invisible ink (260) has been dispensed to produce the desired image on the pharmaceutical product (270). If sufficient edible, invisible ink (260) has not been dispensed (NO, step 430; FIG. 4), the ink dispensing system (200) continues to selectively deposit jetted ink onto the pharmaceutical product (step 410; FIG. 4). If, however, sufficient edible, invisible ink (260) has been dispensed (YES, Step 430; FIG. 4), the dispensed image may optionally be checked for defects (step 440). Adequacy of the volume of edible, invisible ink dispensed may be evaluated by a number of flow-rate sensors (not shown) disposed on the inkjet material dispenser (250).

In order to check the dispensed image for defects (step 440), the pharmaceutical product (270) or other image receiving substrate may be exposed to UV or other appropriate light. According to one exemplary embodiment, the UV light may be any light with a wavelength between approximately 254 and 400 nanometers, or any light with a wavelength in the UV spectrum. Once the surface of the pharmaceutical product is exposed to UV light, or another appropriate light, the edible, invisible ink (260) that has been selectively dispensed onto the surface of the pharmaceutical product will fluoresce in the visible light range making the printed image optically visible. The image may then be scanned by an optical scanning device or optically viewed by a system operator to detect any image defects. Defects may be detected by comparing the resulting image to the previously mentioned computer image.

According to one exemplary embodiment, if image defects are discovered (YES, step 450; FIG. 4), the pharmaceutical product may be discarded (step 460; FIG. 4) and the system adjusted. If, however, no image defects are discovered (NO, step 450; FIG. 4) the pharmaceutical product (270) may be packaged or otherwise distributed.

Figure 5A:
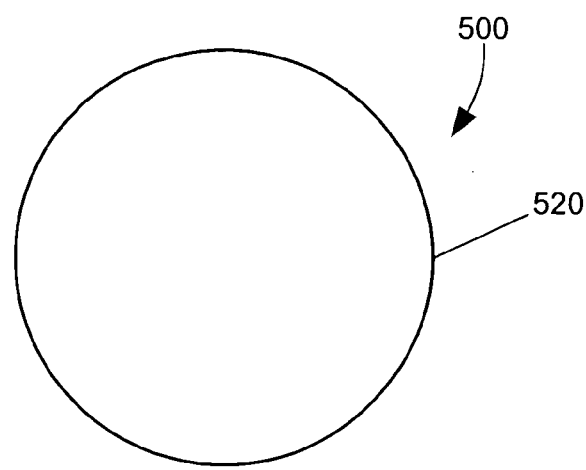
FIG. 5A is a perspective view illustrating a pharmaceutical product incorporating the present system and method when exposed to normal white light conditions according to one exemplary embodiment.

FIG. 5A illustrates a pharmaceutical product (500) that has been processed according to the above-mentioned method when viewed under normal white light conditions according to one exemplary embodiment. As shown in FIG. 5A, a pill (520) or other pharmaceutical product (500) will not display any surface modifications or images when viewed under normal white light. This will maintain the aesthetic integrity of the pharmaceutical product (500).

Figure 5B:
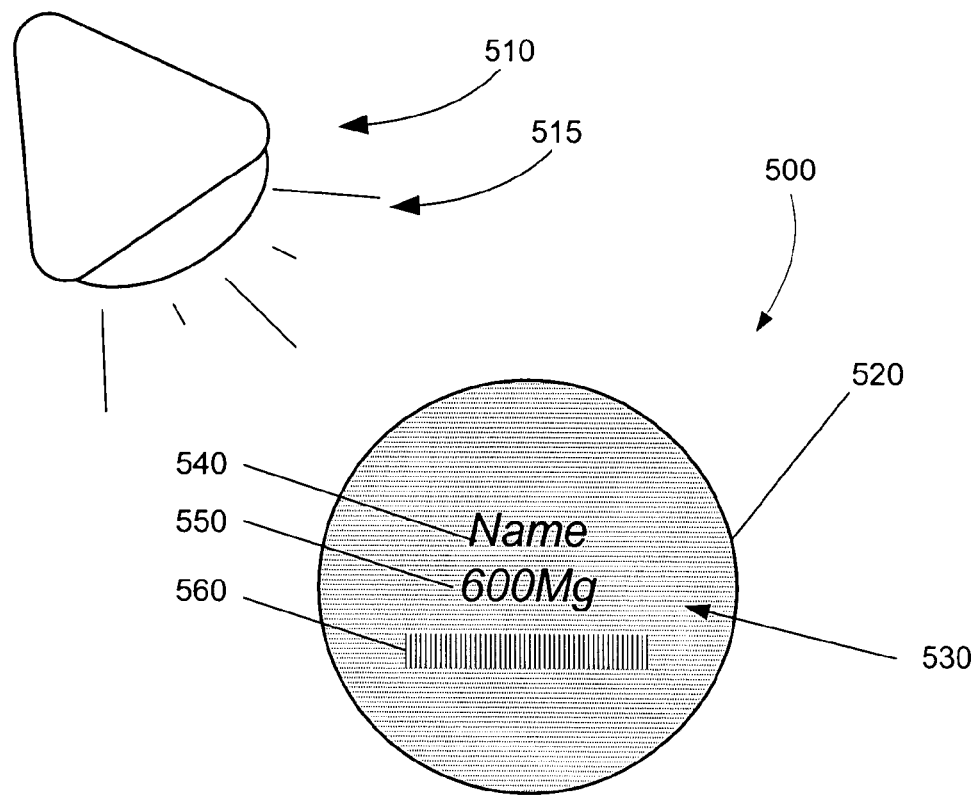
FIG. 5B is a perspective view illustrating a pharmaceutical product incorporating the present system and method when exposed to an ultraviolet light according to one exemplary embodiment.

FIG. 5B illustrates the pill (520) of FIG. 5A when viewed under UV light conditions. As shown in FIG. 5B, when a UV producing lamp (510) or other light source produces UV radiation (515), the edible, invisible ink (260; FIG. 2) that has been disposed on the surface of the pill (520) or other pharmaceutical product (500) fluoresces in the visible range. As shown in FIG. 5B, the present method may be used to produce a number of product identifiers including, but in no way limited to, product names (540), dosage indicators (550), bar codes (560), and/or a general surface hue or color (530).

Marking pharmaceutical solid dosage forms with "invisible" information such as logos, names (540), and bar codes (560) will help track fraudulent dispensing of drugs, protect drugs from counterfeiting, and ensure that patients receive the right medication without affecting the product's appearance. Additionally, dosage indicators (550), bar codes (560), and general surface hue or color (530) may be used by a pharmacist or pharmaceutical distributor to verify that all of the pharmaceuticals in a prescription or a shipment all have equivalent dosages or chemistries. According to one exemplary embodiment, the means for verifying includes retrieving information from a computer or database about a particular pharmaceutical by scanning a bar code printed on the pharmaceutical. In another embodiment, the marked pharmaceuticals may be exposed to UV light and then compared with a patient's medical record to ensure dispensing of the correct medicine.

Figure 6:
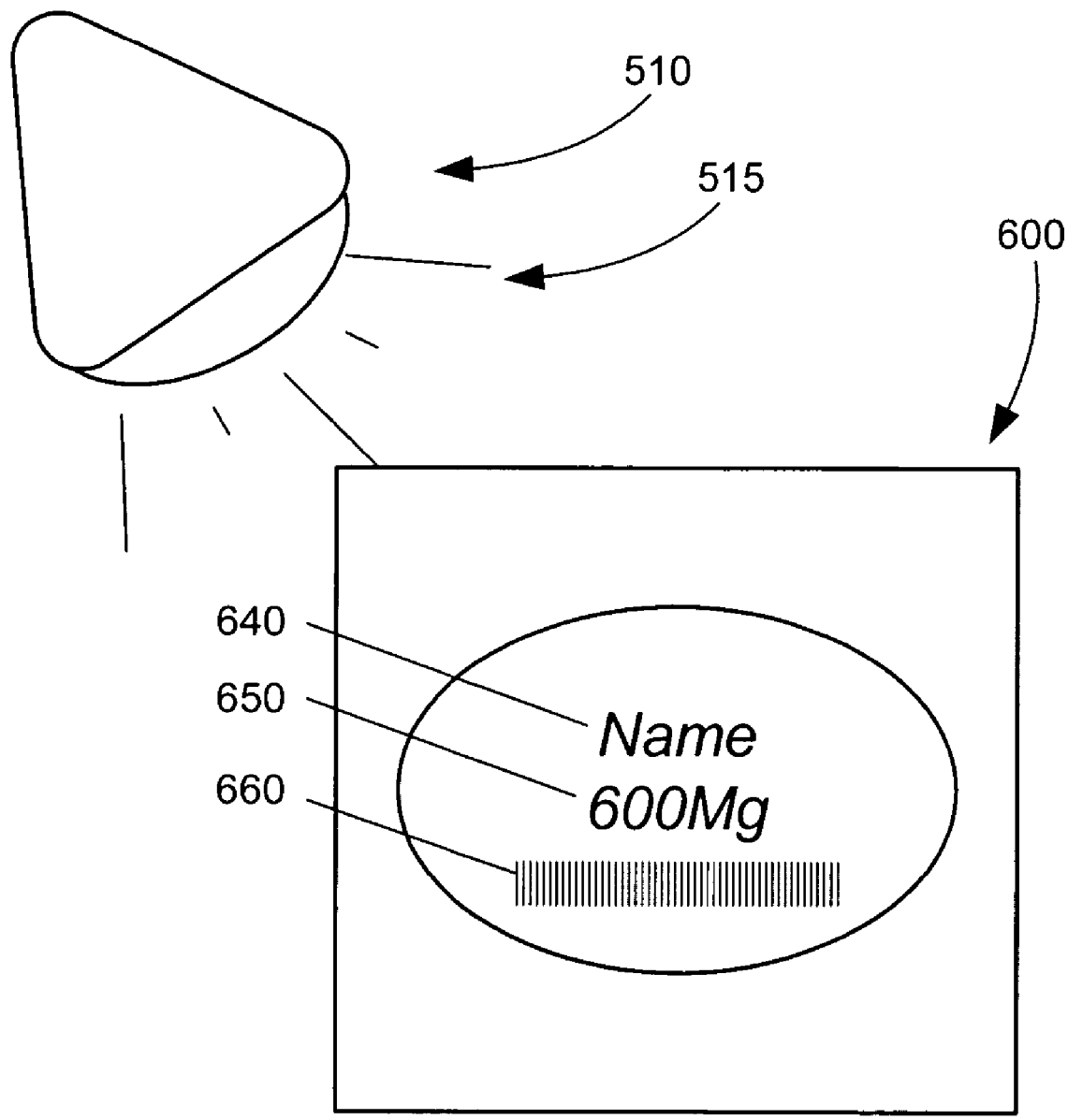
FIG. 6 is a top view of a pharmaceutical packaging incorporating the present system and method according to one exemplary embodiment.

In an alternative embodiment, the present edible invisible ink may be used to mark a urethane polymer covering or other pharmaceutical packaging as shown in FIG. 6. As is illustrated in FIG. 6, pharmaceuticals are often packaged in a urethane polymer covering (600) often referred to as a blister coating. Similar to the restrictions placed on pharmaceuticals, the FDA restricts the colorants that may be used to mark pharmaceutical packaging. According to one exemplary embodiment, the present system and method is used to mark a urethane polymer covering (600) or other pharmaceutical covering with an edible, invisible ink (260; FIG. 2). According to this embodiment, a product name (640), dosage (650), barcode (660), or any other marking may be printed on the urethane polymer coating (600) using the methods explained above. Once printed, the edible, invisible ink (260; FIG. 2) will not obstruct the view of a contained pharmaceutical or otherwise deface the urethane polymer covering (600) when viewed under normal white light conditions. However, when exposed to UV light (515), the edible, invisible ink (260; FIG. 2) fluoresces in the visible light range exposing the product name (640), dosage (650), barcode (660), or other marking printed on the urethane polymer covering (600).

In conclusion, the present system and method for implementing an edible, invisible ink provide a way to print information on pharmaceutical products or other substrates in a manner that is "invisible" to the naked eye when viewed under normal white light conditions. However, when exposed to ultraviolet (UV) light between approximately 254 and 400 nanometers (nm), the edible, invisible ink fluoresces in the visible light range (400–600 nm). The present edible, invisible ink may be safely used to print or otherwise mark on pharmaceutical substrates such as tablets, capsules, gel caps, pills, caplets, and other solid dosage forms; dental products and instruments; and or food products.

Products may be marked by the present edible, invisible ink with information such as, but not limited to, logos, names, bar codes, alphanumeric codes, text, watermarks, and other markings. Marking pharmaceuticals with information using invisible ink allows manufacturers and distributors to control fraudulent dispensing of drugs, control counterfeit production of drugs, and ensure that patients receive the correct medication, among other things.

The preceding description has been presented only to illustrate and describe exemplary embodiments of the present system and method. It is not intended to be exhaustive or to limit the system and method to any precise form disclosed. Many modifications and variations are possible in light of the above teaching. It is intended that the scope of the system and method be defined by the following claims.

What is claimed is:

1. An ink comprising:
   a jettable vehicle; and
   a colorant configured to fluoresce in a visible light range when exposed to an ultraviolet (UV) light;
   wherein said ink is edible, and wherein said ink is invisible when viewed under white light conditions.

2. The ink of claim 1, wherein said jettable vehicle comprises a solvent.

3. The ink of claim 2, wherein said solvent comprises one of water, an alcohol or both water and an alcohol.

4. The ink of claim 2, wherein said jettable vehicle further comprises a surfactant.

5. The ink of claim 4, wherein said surfactant comprises one of an ethyl alcohol, a glycerol, a methyl alcohol, an isopropyl alcohol, a butyl alcohol, a lecithin, a crillet, a polyoxyethylene sorbitan monostearate, a xanthan gum, a sorbitol, or an edible starch or any combination thereof.

6. The ink of claim 1, wherein said jettable vehicle further comprises an edible humectant.

7. The ink of claim 6, wherein said edible humectant comprises one of a glycerin, a sorbitol, or a mannitol or any combination thereof.

8. The ink of claim 1, wherein said jettable vehicle further comprises an edible pH buffer.

9. The ink of claim 8, wherein said edible pH buffer comprises sulfuric acid.

10. The ink of claim 8, wherein an intensity of said colorant fluorescence is varied by varying a concentration of said edible pH buffer.

11. The ink of claim 1, wherein said colorant comprises a naturally fluorescent compound.

12. The ink of claim 11, wherein said colorant comprises one of a riboflavin, a riboflavin phosphate, a pyridoxine hydrochloride, a folic acid, a D&C Orange No. 5, a niacin, a nicotinamide, or a quinine sulfate or any combination thereof.

13. The ink of claim 1, further comprising:
   a jettable vehicle including a solvent, a surfactant, and a buffer; and
   an edible colorant.

14. The ink of claim 13, wherein:
   said solvent comprises water;
   said surfactant comprises ethyl alcohol;
   said buffer comprises sulfuric acid; and
   said edible colorant comprises quinine sulfate.

15. The ink of claim 14, wherein:
   said water comprises approximately 80% by volume of said ink;
   said ethyl alcohol comprises approximately 20% by volume of said ink;
   said sulfuric acid comprises approximately 0.05 mol per liter of said water; and
   said quinine sulfate comprises approximately 2 milligrams per milliliter of said ink.

16. The ink of claim 1, further comprising
   a jettable vehicle including a solvent, a surfactant, and a humectant; and
   an edible colorant.

17. The ink of claim 16, wherein:
said solvent comprises water;
said surfactant comprises ethyl alcohol;
said humectant comprises glycerin; and
said colorant comprises riboflavin 5'-phosphate.

18. The ink of claim 17, wherein:
said water comprises approximately 80% by volume of said ink;
said ethyl alcohol comprises approximately 17% by volume of said ink;
said glycerin comprises approximately 3% by volume of said ink; and
said riboflavin phosphate comprises approximately 9 milligrams per milliliter of said ink.

19. The ink of claim 1, further comprising:
a jettable vehicle including water, ethyl alcohol, glycerin, lecithin, and sorbitol; and
an edible colorant.

20. The ink of claim 19, wherein said edible colorant comprises one of a riboflavin, a riboflavin phosphate, a pyridoxine hydrochloride, a folic acid, a D&C Orange No. 5, a niacin, a nicotinamide, or a quinine sulfate or any combination thereof.

21. The ink of claim 1, wherein said ink further comprises one of a drier, a thinner, a wax, a lubricant, a reducing oil, a body gum, a binding varnish, an antioxidant, an anti-skinning agent, a resin, or a binder or any combination thereof.

22. The ink of claim 1, wherein:
said jettable vehicle comprises water; and
said colorant comprises a naturally occurring fluorescent compound.

23. The ink of claim 22, wherein said colorant comprises one of a riboflavin, a riboflavin phosphate, a pyridoxine hydrochloride, a folic acid, a D&C Orange No. 5, a niacin, a nicotinamide, or a quinine sulfate or any combination thereof.

24. A method for making an edible, invisible ink, comprising:
forming an ink vehicle including a solvent; and
adding a colorant to said vehicle, said colorant being configured to fluoresce when exposed to ultraviolet light;
wherein said ink vehicle and said colorant are edible and invisible when viewed under white light conditions.

25. The method of claim 24, further comprising:
adding at least one additive to said edible, invisible ink;
wherein said at least one additive is edible and invisible when viewed under white light conditions.

26. The method of claim 25, wherein said at least one additive comprises one of a surfactant, a humectant, or a buffer or any combination thereof.

27. The method of claim 24, further comprising:
preparing an aqueous acid solution;
adding a colorant to said aqueous acid solution;
adding a surfactant to said aqueous acidic solution; and
mixing said solution until said colorant is well dissolved in said aqueous acid solution.

28. The method of claim 27, wherein:
said aqueous acid solution comprises 0.05 molar aqueous sulfuric acid;
said colorant comprises quinine sulfate; and
said surfactant comprises ethyl alcohol.

29. The method of claim 24, further comprising:
combining a solvent, a surfactant, and a humectant;
adding a colorant to said combination; and
mixing said combination until said colorant is dissolved.

30. The method of claim 29, wherein:
said solvent comprises water;
said surfactant comprises an ethyl alcohol;
said humectant comprises a glycerin; and
said colorant comprises a riboflavin phosphate.

31. A method for labeling a substrate comprising:
positioning said substrate adjacent to an inkjet material dispenser; and
selectively jetting an edible ink onto said substrate with said inkjet material dispenser;
wherein said edible ink includes a colorant configured to fluoresce in a visible light range when exposed to an ultraviolet light, and wherein said ink is invisible when viewed under white light conditions, said edible ink includes a jettable vehicle.

32. The method of claim 31, wherein said substrate comprises a pharmaceutical product.

33. The method of claim 32, wherein said pharmaceutical product comprises one of a tablet, a capsule, a gel cap, a pill, or a caplet.

34. The method of claim 31, wherein said substrate comprises one of a food product, a pharmaceutical covering, or a dental product.

35. The method of claim 31, wherein said inkjet material dispenser comprises one of a thermally actuated inkjet dispenser, a mechanically actuated inkjet dispenser, an electrostatically actuated inkjet dispenser, a magnetically actuated dispenser, a piezoelectrically actuated dispenser, or a continuous inkjet dispenser.

36. The method of claim 31, wherein said selectively jetting comprises:
forming a desired image on a program hosted by a computing device;
translating said desired image into a plurality of machine commands configured to control said inkjet material dispenser; and
causing said inkjet material dispenser to selectively dispense said edible ink onto said substrate in a pattern corresponding to said desired image.

37. The method of claim 36, wherein said desired image comprises a product identifiable mark.

38. The method of claim 37, wherein said product identifiable mark comprises one of a logo, a name, a bar code, a dosage indicator, a general surface hue, or a color.

39. The method of claim 31, wherein said ultraviolet light has a wavelength between 254 and 400 nanometers.

40. A method for labeling a pharmaceutical product comprising:
positioning said pharmaceutical product adjacent to an inkjet material dispenser; and
selectively jetting an edible ink onto said pharmaceutical product with said inkjet material dispenser;
wherein said edible ink includes a colorant configured to fluoresce in a visible light range when exposed to an ultraviolet light, and wherein said ink is invisible when viewed under white light conditions, said edible ink includes a jettable vehicle.

41. The method of claim 40, wherein said selectively jetting an edible ink onto said pharmaceutical product comprises jetting said edible, invisible ink in the form of a desired image.

42. The method of claim 41, wherein said desired image comprises a product identifiable mark.

43. The method of claim 42, wherein said product identifiable mark comprises one of a logo, a name, a bar code, a dosage indicator, a general surface hue, or a color.

44. The method of claim 40, wherein said pharmaceutical product comprises one of a tablet, a capsule, a gel cap, a pill, a caplet, or a pharmaceutical covering.

45. A method for marking a pharmaceutical product, comprising:
printing information on a pharmaceutical product with an edible ink;
wherein said edible ink includes a colorant configured to fluoresce in a visible light range when exposed to an ultraviolet light, and wherein said ink is invisible when viewed under white light conditions, said edible ink includes a jettable vehicle.

46. The method of claim 45, wherein said pharmaceutical product comprises a tablet, a capsule, a gel cap, a caplet, a pill, or a pharmaceutical covering.

47. The method of claim 45, wherein said information is printed by one of a thermally actuated inkjet dispenser, a mechanically actuated inkjet dispenser, an electrostatically actuated inkjet dispenser, a magnetically actuated dispenser, a piezoelectrically actuated dispenser, or a continuous inkjet dispenser.

48. The method of claim 45, wherein said information comprises one of a logo, a name, a number, a bar code, an alphanumeric code, a text, or a watermark.

49. A pharmaceutical comprising:
a surface,
wherein said surface is marked with an edible ink;
said edible ink includes a colorant configured to fluoresce in a visible light range when exposed to an ultraviolet light, and wherein said ink is invisible when viewed under white light conditions, said edible ink includes a jettable vehicle.

50. The pharmaceutical of claim 49, wherein said pharmaceutical comprises one of a tablet, a capsule, a gel cap, a caplet, or a pill.

51. The pharmaceutical of claim 49, wherein said mark comprises information regarding said pharmaceutical.

52. The pharmaceutical of claim 51, wherein said mark comprises one of a logo, a name, a number, a bar code, an alphanumeric code, a text, a watermark, or a color.

53. The pharmaceutical of claim 49, wherein said edible invisible ink is distributed on said surface by one of a thermally actuated inkjet dispenser, a mechanically actuated inkjet dispenser, an electrostatically actuated inkjet dispenser, a magnetically actuated dispenser, a piezoelectrically actuated dispenser, or a continuous inkjet dispenser.

54. The method of claim 24, further comprising adding an edible pH buffer to said ink vehicle.

55. The method of claim 54, wherein said edible pH buffer comprises sulfuric acid.

56. The method of claim 24, further comprising varying an intensity of said colorant fluorescence by varying a concentration of said edible pH buffer.

57. The ink of claim 1, wherein said colorant comprises quinine sulfate, riboflavin phosphate or both quinine sulfate and riboflavin phosphate.

58. The method of claim 24, wherein said colorant comprises quinine sulfate, riboflavin phosphate or both quinine sulfate and riboflavin phosphate.

* * * * *